US 6,666,950 B2

(12) United States Patent
Li et al.

(10) Patent No.: US 6,666,950 B2
(45) Date of Patent: Dec. 23, 2003

(54) PROCESS FOR DEINKING PAPER USING A TRIGLYCERIDE (75) Inventors: Chin Li, Huntington, WV (US); Rodger Segelstrom, Appleton, WI (US)

(73) Assignee: BASF AG, Ludwigshafen (DE)

( * ) Notice: Subject to any disclaimer, the term of this patent is extended or adjusted under 35 U.S.C. 154(b) by 15 days.

(21) Appl. No.: 09/996,489

(22) Filed: Nov. 28, 2001

(65) Prior Publication Data

US 2003/0106654 A1 Jun. 12, 2003

(51) Int. Cl.$^7$ .................................................. D21C 5/02
(52) U.S. Cl. ............................ 162/5; 162/72; 162/75; 162/76
(58) Field of Search ........................... 162/4, 5, 72, 75, 162/76; 436/71

(56) References Cited

U.S. PATENT DOCUMENTS

| 4,483,742 A | 11/1984 | Bridle ............................ 162/5 |
| 4,518,459 A | 5/1985 | Freis et al. ..................... 162/5 |
| 4,586,982 A * | 5/1986 | Poppel et al. .................. 162/5 |
| 4,627,876 A | 12/1986 | Fries et al. .................... 106/27 |
| 4,935,096 A | 6/1990 | Gallagher et al. ............. 162/5 |
| 4,950,420 A | 8/1990 | Svarz ........................ 252/321 |
| 4,959,123 A | 9/1990 | Lehmann et al. .............. 162/5 |
| 4,964,949 A | 10/1990 | Hamaguchi et al. ........... 162/5 |
| 4,971,656 A | 11/1990 | Lehmann et al. .............. 162/5 |
| 5,100,574 A | 3/1992 | Urushibata et al. ..... 252/174.22 |
| 5,120,397 A | 6/1992 | Urushibata et al. ............ 162/5 |
| 5,151,155 A | 9/1992 | Cody et al. .................... 162/5 |
| 5,176,796 A | 1/1993 | Irie et al. .................... 162/174 |
| 5,200,034 A | 4/1993 | Richmann et al. ............. 162/5 |
| 5,221,433 A | 6/1993 | Daute et al. ................... 162/5 |
| 5,225,046 A | 7/1993 | Borchardt ...................... 162/5 |
| 5,227,019 A | 7/1993 | Borchardt ...................... 162/6 |
| 5,238,533 A | 8/1993 | Engelskirchen et al. ....... 162/5 |

(List continued on next page.)

FOREIGN PATENT DOCUMENTS

| CA | 2056547 | 11/1991 | ............ C07C/69/22 |
| CA | 2147384 | 4/1996 | ............ D12C/5/02 |
| EP | 307024 | 8/1988 | ............ C09D/9/04 |
| EP | 492224 | 12/1991 | ............ C09D/9/04 |
| EP | 516099 | 5/1992 | ............ C07C/67/29 |
| JP | 59015590 | 2/1984 | ............ H02P/5/00 |
| JP | 59030978 | 9/1985 | ............ F16H/45/02 |
| JP | 63182489 | 2/1990 | ............ G03D/3/04 |
| JP | 63227880 | 3/1990 | ............ B23B/15/08 |
| JP | 07-003680 | 1/1995 | ............ D21C/5/02 |
| WO | WO9902770 | 1/1999 | ............ D21C/5/02 |
| WO | WO9935223 | 7/1999 | ............ C11D/1/38 |
| WO | WO0073574 | 12/2000 | ............ D21C/3/28 |

OTHER PUBLICATIONS

English Language Abstract for DE42 04 540 A1.
English Language Abstract for JP05140884.
English Language Abstract for JP05222687.
English Language Abstract For JP05125682.
English Language Abstract For JP05051887.
English Language Abstract For JP04289286.
English Language Abstract For JP04163386.
English Language Abstract For JP03000881.
English Language Abstract For JP02293483.
English Language Abstract For JP63227880.
English Language Abstract For JP63182489.
English Language Abstract For JP59030978.
English Language Abstract for JP07–003680.
English Language Abstract for JP03249291.
English Language Abstract for JP02293485.

Primary Examiner—Steve Alvo
(74) Attorney, Agent, or Firm—Michael F. Morgan (57) ABSTRACT A method is provided for deinking paper. Repulped paper is treated with a deinking comprising a triglyceride. A preferred triglyceride is beef tallow. The deinking composition reduces foaming and increases brightness.

17 Claims, 11 Drawing Sheets

U.S. PATENT DOCUMENTS

| | | | |
|---|---|---|---|
| 5,248,388 A | 9/1993 | Richmann et al. | 162/5 |
| 5,258,099 A | 11/1993 | Borchardt | 162/5 |
| 5,281,358 A | 1/1994 | Urushibata et al. | 252/174.21 |
| 5,282,928 A | 2/1994 | Takahashi et al. | 162/5 |
| 5,288,369 A | 2/1994 | Ishibashi et al. | 162/5 |
| 5,302,243 A | 4/1994 | Ishibashi et al. | 162/5 |
| 5,304,316 A | 4/1994 | Urushibata et al. | 252/60 |
| 5,308,448 A | 5/1994 | Behler et al. | 162/7 |
| 5,336,372 A | 8/1994 | Cody et al. | 162/5 |
| 5,346,543 A | 9/1994 | Hirakouchi et al. | 106/243 |
| 5,362,363 A | 11/1994 | Smolka et al. | 162/8 |
| 5,403,440 A | 4/1995 | Daute et al. | 162/5 |
| 5,415,733 A | 5/1995 | Robinson et al. | 162/5 |
| 5,417,807 A | 5/1995 | Fossas et al. | 162/5 |
| 5,417,808 A | 5/1995 | Okamoto et al. | 162/5 |
| 5,442,082 A | 8/1995 | Uphues et al. | 554/149 |
| 5,460,698 A | 10/1995 | Nguyen | 162/158 |
| 5,505,817 A | 4/1996 | Rodriguez et al. | 162/5 |
| 5,518,581 A | 5/1996 | Miyagoshi et al. | 162/5 |
| 5,560,805 A | 10/1996 | Hamilton et al. | 162/5 |
| 5,580,422 A | 12/1996 | Hamilton et al. | 162/4 |
| 5,582,681 A | 12/1996 | Back et al. | 162/5 |
| 5,599,596 A | 2/1997 | Sandvick et al. | 428/34.2 |
| 5,609,722 A | 3/1997 | Rodriguez et al. | 162/5 |
| 5,620,565 A | 4/1997 | Lazorisak et al. | 162/72 |
| 5,622,597 A | 4/1997 | Callen et al. | 162/5 |
| 5,634,969 A | 6/1997 | Cody et al. | 106/287.17 |
| 5,658,427 A | 8/1997 | Clungeon et al. | 162/5 |
| 5,660,684 A | 8/1997 | Li et al. | 162/5 |
| 5,672,244 A | 9/1997 | Takahashi et al. | 162/5 |
| 5,696,292 A | 12/1997 | Cody et al. | 564/296 |
| 5,716,498 A | 2/1998 | Jenny et al. | 162/158 |
| 5,718,801 A | 2/1998 | Li et al. | 162/5 |
| 5,725,730 A | 3/1998 | Smolka et al. | 162/5 |
| 5,759,938 A | 6/1998 | Cody et al. | 502/62 |
| 5,798,046 A | 8/1998 | Greer et al. | 210/5 |
| 5,807,464 A | 9/1998 | Jobbins et al. | 162/5 |
| 5,817,212 A | 10/1998 | Jobbins et al. | 162/5 |
| 5,827,397 A | 10/1998 | Blanco | 162/5 |
| 5,830,842 A | 11/1998 | Keys | 510/437 |
| 5,837,097 A | 11/1998 | Egawa et al. | 162/5 |
| 5,837,099 A | 11/1998 | Borchardt | 162/5 |
| 5,840,157 A | 11/1998 | Hagiwara et al. | 162/5 |
| 5,866,526 A | 2/1999 | Olsen et al. | 510/392 |
| 5,880,077 A | 3/1999 | Ishibashi et al. | 510/174 |
| 5,914,006 A | 6/1999 | Nellessen et al. | 162/158 |
| 5,968,313 A | 10/1999 | Bentley | 162/5 |
| 6,013,157 A | 1/2000 | Li et al. | 162/5 |
| 6,027,610 A | 2/2000 | Back et al. | 162/111 |
| 6,057,375 A | 5/2000 | Wollenweber et al. | 516/133 |
| 6,077,389 A | 6/2000 | Sawai et al. | 162/4 |
| 6,103,056 A | 8/2000 | Irinatsu et al. | 162/4 |
| 6,103,687 A | 8/2000 | Cody et al. | 510/504 |
| 6,179,957 B1 | 1/2001 | Irinatsu et al. | 162/4 |
| 6,235,914 B1 | 5/2001 | Steiger et al. | 554/114 |
| 6,251,220 B1 | 6/2001 | Irinatsu et al. | 162/5 |

\* cited by examiner

FIGURE 1A

- ◆ 1-Blank
- ● 2-Surfactant Only
- ▲ 3-75%Surfactant/25%Triglyceride
- × 4-50%Surfactant/50%Triglyceride
- ■ 5-25%Surfactant/75%Triglyceride

FIGURE 1B

- ◆ 1-Blank —— Linear (1-Blank)

FIGURE 1C

● 2-Surfactant Only — Linear (2-Surfactant Only)

FIGURE 1D

▲ 3-75%Surfactant/25%Triglyceride
— Linear (3-75%Surfactant/25%Triglyceride)

FIGURE 1E

× 4-50%Surfactant/50%Triglyceride
— Linear (4-50%Surfactant/50%Triglyceride)

FIGURE 1F

■ 5-25%Surfactant/75%Triglyceride
— Linear (5-25%Surfactant/75%Triglyceride)

FIGURE 2A

- ◆ 1- (5;1) Surfactant Only
- ● 2- (80;16) Fatty Acid Soap w/CaCl
- ▲ 3- (5;1) Surfactant / (5;1) Triglyceride
- × 4- (5;1) Surfactant / (35;7) Triglyceride
- ■ 5- (5;1) Surfactant / (20;4) Triglyceride
- ○ 6- (80;16) Fatty acid soap

▲ 3- (5;1) Surfactant / (5;1) Triglyceride
— Linear (3- (5;1) Surfactant / (5;1) Triglyceride)

FIGURE 2E

✕ 4- (5;1) Surfactant/ (35;7) Triglyceride
— Linear (4- (5;1) Surfactant/ (35;7) Triglyceride)

FIGURE 2F

■ 5- (5;1) Surfactant / (20;4) Triglyceride
— Linear (5- (5;1) Surfactant / (20;4) Triglyceride)

FIGURE 2G

○ 6- (80;16) Fatty acid soap  — Linear (6- (80;16) Fatty acid soap)

FIGURE 3A

- ◆ 1- (80;16) Fatty Acid Soap
- ● 2- (5;1) Surfactant Only
- ▲ 3- (5;1) Surfactant / (5;1) Triglyceride
- × 4- (5;1) Surfactant / (10;2) Triglyceride
- ■ 5- (5;1) Surfactant / (20;4) Triglyceride
- ○ 6- (5;1) Surfactant / (2.5;0.5) Triglyceride
- + 7- (5;1) Surfactant / (40;8) Triglyceride

FIGURE 3B

- ◆ 1- (80;16) Fatty Acid Soap —— Linear (1- (80;16) Fatty Acid Soap)

FIGURE 3C

• 2- (5;1) Surfactant Only — Linear (2- (5;1) Surfactant Only)

FIGURE 3D

▲ 3- (5;1) Surfactant / (5;1) Triglyceride
— Linear (3- (5;1) Surfactant / (5;1) Triglyceride)

FIGURE 3E

× 4- (5;1) Surfactant / (10;2) Triglyceride
— Linear (4- (5;1) Surfactant / (10;2) Triglyceride)

FIGURE 3F

■ 5- (5;1) Surfactant / (20;4) Triglyceride
— Linear (5- (5;1) Surfactant / (20;4) Triglyceride)

FIGURE 3G

○ 6- (5;1) Surfactant / (2.5;0.5) Triglyceride
— Linear (6- (5;1) Surfactant / (2.5;0.5) Triglyceride)

FIGURE 3H

+ 7- (5;1) Surfactant / (40;8) Triglyceride
— Linear (7- (5;1) Surfactant / (40;8) Triglyceride)

PROCESS FOR DEINKING PAPER USING A TRIGLYCERIDE

FIELD OF THE INVENTION

The present invention is directed to the addition of a triglyceride in a deinking process.

BACKGROUND OF THE INVENTION

Paper is a renewable resource and can be recycled to make new paper. Papers that can be recycled include, but are not limited to, newspaper, mixed office waste, and magazine paper. In order to be recycled, the paper is repulped into cellulose fibers. The fibers are swelled with alkaline water to form an aqueous slurry to assist in detaching the ink particles from the fibers. In order to remove these detached ink particles from the slurry, many deinking processes are available.

One method of deinking is washing. In wash deinking, at least one surfactant is added to make the ink hydrophilic, and to allow the ink to be washed away. The particle size of the ink is generally about 2–20 μm in order to allow the ink particles to flow through a fiber mat.

Another deinking method is froth flotation. A gas, such as air, is passed through the slurry, and the ink particles attach themselves to the air bubbles in the slurry. These bubbles rise to the top of the slurry and form a froth layer at the surface, which is then removed. It is desired to remove as much ink as possible in order to reduce the dirt counts and increase brightness of the paper. It is desired to keep the ink hydrophobic in this process. Also, the ink typically has a particle size of 10–200 μm. The upper limit of the particle size is limited by the ability to keep the ink particle attached to the air bubble. If the particle is too large, then the ink particles will detach from the bubble.

Generally, deinking agents are added to assist in detaching and the subsequent removal of the ink from the cellulose fibers. Generally, deinking agents include one or more surfactants. Surfactants are surface active agents that alter the surface properties of the ink particles. In wash deinking, surfactants form micelles for holding the ink particles. Ink particles are generally hydrophobic, and the surfactant makes the ink particle more hydrophilic and allows the ink to remain in the aqueous phase without being redeposited onto the paper fibers. In flotation deinking, on the other hand, added surfactants cause ink particles to be more hydrophobic. Also included in the repulping and deinking process are bases, such as alkali metal hydroxides; alkali metal silicates; chelating agent, and bleaching agents.

Fatty acid soaps have been used in deinking of old newsprint as an ink collector for subsequent removal via froth flotation in many deinking systems. This chemical, while useful, often requires the end user to convert fatty acid to fatty acid soaps on site resulting in significant capital costs.

The application of the fatty acid soap also requires the use of a metal source, such as calcium. In the case of calcium, the source can be calcium chloride or lime, which is added to provide the free metal ions needed to form the insoluble soap. Problems associated with the addition of calcium are corrosion due to the excess chlorine and/or scale formation of calcium carbonate. Additionally, the use of fatty acid soaps can generate excessive foam in the deinking process.

It would be desirable to reduce either the amount or eliminate the use of fatty acid soaps. This could result in a savings of capital, operating costs, and could reduce or eliminate corrosion or scaling.

SUMMARY OF THE INVENTION

The present invention provides a method of deinking paper comprising providing a paper slurry, wherein at least a portion of the paper contains a marking material, and treating the paper slurry with a deinking composition comprising at least one triglyceride.

DETAILED DESCRIPTION

A method is provided for deinking paper. Paper is repulped into a slurry of cellulose fibers. At least a portion of the paper that is supplied for repulping contains a marking material. As used herein, the term marking material is used to refer to any material used to mark paper. Examples include, but are not limited to, ink, toner, dye, pencil, marker, crayon, and highlighter. Deinking refers to the removal of the marking material from the paper fibers.

The paper slurry is provided to a deinking process, wherein the paper is treated with a deinking composition. The deinking composition comprises at least one triglyceride.

Triglycerides are esters of long-chain carboxylic acids and glycerol (propane-1,2,3-triol) wherein three fatty acids replace the three hydrogen atoms in the hydroxyl groups of the glycerol. The carboxylic acids can be the same or different and can be saturated or unsaturated. Examples include, but are not limited to, lauric acid, myristic acid, palmitic acid, stearic acid, oleic acid, eleostearic acid, linoleic acid, and linolenic acid. An example of a triglyceride is beef tallow. Beef tallow is a mixture of triglycerides, and generally contains the following fatty acids in varying proportions: stearic acid, palmitic acid, and oleic acid. The tallow can be refined or hydrogenated.

The triglycerides are generally added to the paper slurry in an amount from about 0.1 to about 15 kg per 1000 kg (about 0.2 to about 30 pounds per ton) of oven dried fiber. Preferably, the triglycerides are added to the paper slurry in an amount from about 0.25 to about 5 kg per 1000 kg (about 0.5 to about 10 pounds per ton) of oven dried fiber.

Additionally, a surfactant can be included in the deinking composition. The surfactant can be any anionic, nonionic, or cationic surfactant. Specific examples of surfactants that can be included in the deinking composition include, but are not limited to, alkoxylated fatty alcohols, surfactants derived from fatty acids, and surfactants derived from tallow fatty acids. A preferred alkoxylated fatty alcohol is sold under the trademark FLOATSAN™ 209 available from BASF Corporation, Mt. Olive, N.J.

Generally, the surfactant is added in an amount from about 0.01 to about 5 kg per 1000 kg (about 0.02 to about 10 pounds per ton) of oven dried fiber. Preferably, the surfactants are added to the paper slurry in an amount from about 0.01 to about 2 kg per 1000 kg (about 0.02 to about 4 pounds per ton) of oven dried fiber.

Generally, a deinking composition comprising the triglyceride and surfactant is added to the paper slurry in an amount from about 0.1 to about 15 kg per 1000 kg (about 0.2 to about 30 pounds per ton) of oven dried fiber. Preferably, the deinking composition is added in an amount from about 0.25 to about 7.5 kg per 1000 kg (about 0.5 to about 15 pounds per ton) of oven dried fiber.

In the deinking composition itself, the amount of triglyceride generally ranges from about 2% to 100% based on the dry weight of the components in the deinking composition. The amount of surfactant generally ranges from 0% to about 98% based on the dry weight of the components in the deinking composition. Preferably, the amount triglyceride is from about 50% to about 100%, and the amount of surfactant is from 0% to about 50%.

The paper slurry is preferably treated by using a froth flotation process. The paper is pulped and formed into a slurry with water. Generally, the slurry has a consistency from about 0.2% to about 20% based on the weight of the paper in the slurry. The deinking composition can be added in the pulper or to the slurry, and a gas, such as air, is passed through the slurry. The deinking composition causes the ink particles to attach to the air bubbles and to aggregate at the surface of the slurry where they can be removed.

Generally, the deinking process is performed at an alkaline pH. Generally, the pH ranges from about 7 to about 12. Generally, the temperature of the deinking process is from about 20° C. to about 70° C.

The deinking composition of the present invention provides control over the foaming tendency of the paper slurry. Depending upon the fillers and the level of surface active agents that are in the paper to be deinked, foam is generated by the deinking process. Excess amount of foam results in higher reject rates of deinked batches. The reject rate is the ratio of the amount of material removed during the flotation process versus the amount of material used for the flotation process expressed as a percentage. One measurement of the effect of the deinking composition of the present invention to reduce foaming is that for a given brightness, there will be a lower reject rate as compared to compositions without a triglyceride.

The deinking composition of the present invention also provides increased brightness for the deinked paper fiber. By being more effective at removing ink, a higher brightness can be achieved.

SPECIFIC EMBODIMENTS OF THE INVENTION

The triglyceride/surfactant emulsion was compared to other deinking compositions in the following non-limiting examples. In the examples, the triglyceride was provided by an emulsion product that included beef tallow, coco fatty acid, potassium hydroxide, fatty alcohol ethoxylate, biocide, and water.

For each example, the following conditions apply.

PULPING—Conditions are given in each example below.

CONDITIONING—Conditioning was performed in the presence of the particular deinking composition using the laboratory disintegrator for a total of 5000 revolutions. A 500 g sample (30 g oven dried pulp) of the pulped slurry was placed in the vessel and diluted to 1.5% consistency. The deinking composition was added at that time and the slurry was allowed to condition for the specified number of revolutions.

FLOTATION—Flotation was done at 1.0% consistency for the time period specified depending upon the type of furnish being used. The type of flotation cell used was a WEMCO™ laboratory flotation cell. All samples were allowed to mix for 1 minute in the flotation cell prior to flotation to ensure the homogeneity of the slurry. The flotation accepts were used to make handsheets for subsequent optical analysis. The rejects were collected, dried and weighed in order to determine the amount of rejects for each deinking composition evaluated.

Brightness of the samples was measured by TAPPI Standard T452. Briefly, brightness is a numerical value of the reflectance factor of a sample with respect to blue light at 457 nm.

EXAMPLE 1

100% Old Magazine (OMG)—Deinking of OMG furnish is often associated with large amounts of foam generation due to the amount of filler present in this type of furnish. The effectiveness of several deinking compositions were evaluated by comparing brightness as a function of reject rates for several batches. In theory, as the slope of the line increases, lower reject rates provide similar pulp brightness level. In other words, the brightness gain should increase when the reject rates remain the same.

PULPING

| Furnish | 200 g |
| --- | --- |
| Consistency | 6% |
| Temperature | 54.4° C. (130° F.) |
| pH | 10.5 ± 0.5 |
| Chemicals (based on actives) | 0.5% NaOH (sodium hydroxide) |
| | 1.0% $Na_2SiO_3$ (sodium silicate) |
| | 0.4% DTPA (diethylenetriamine pentaacetic acid) |
| | 1.0% $H_2O_2$ (hydrogen peroxide) |

Pulping was done under the above conditions using an Adirondack laboratory pulper. Pulping time was set at 10 minutes at a motor capacity of 94%. Several batches were pulped and mixed thoroughly for each study in order to provide a uniform slurry. The final pulp slurry was then allowed to sit at ambient conditions for 1 hour prior to initiating flotation studies.

Figure 1A:
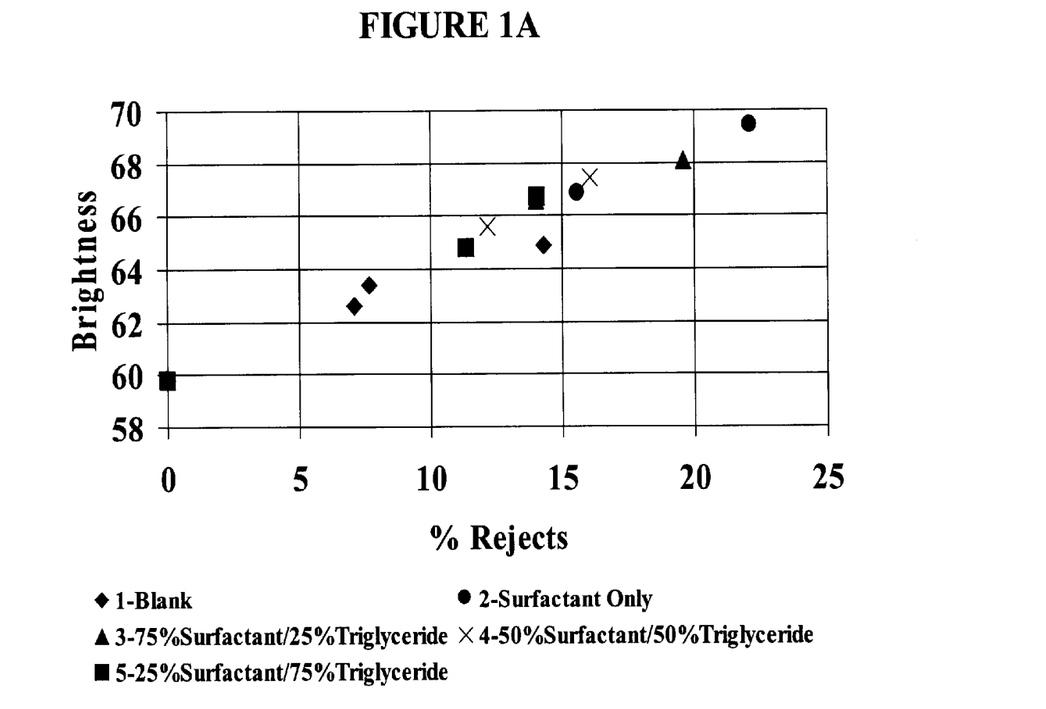
FIGS. 1A to 1F are graphical representations of the data from Example 1. The linear regression for each sample set is shown in a separate graph for clarity.
Figure 1B:
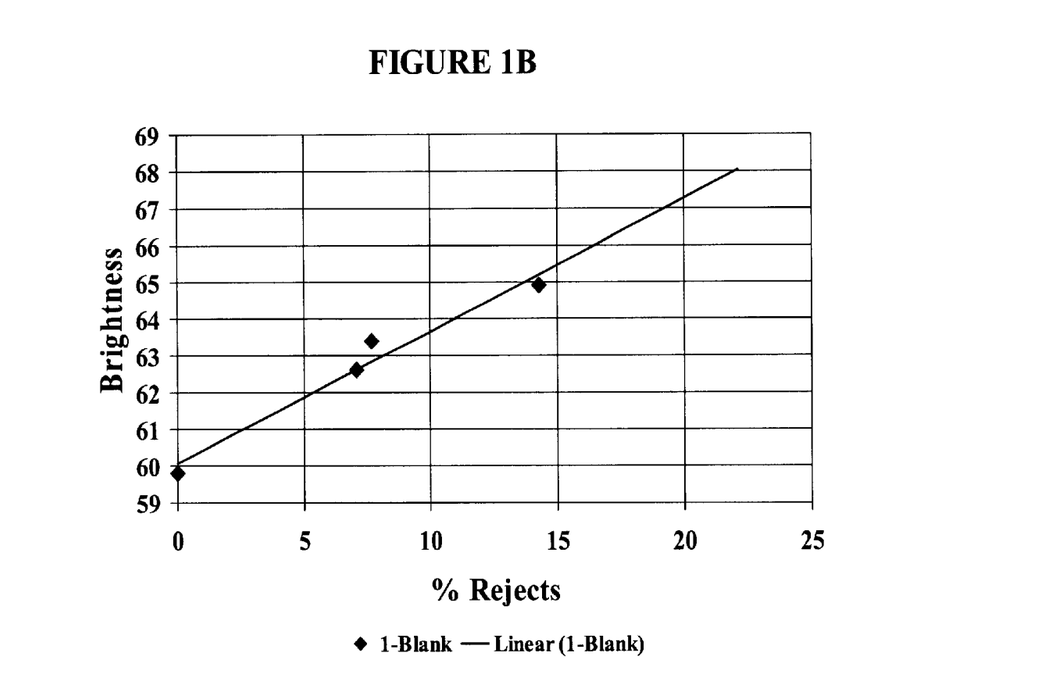
Figure 1C:
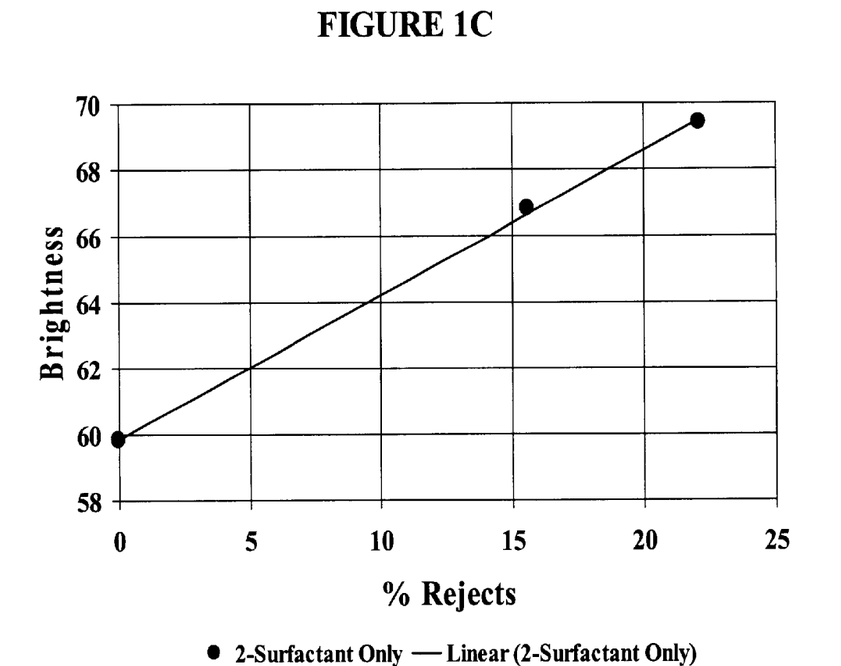
Figure 1D:
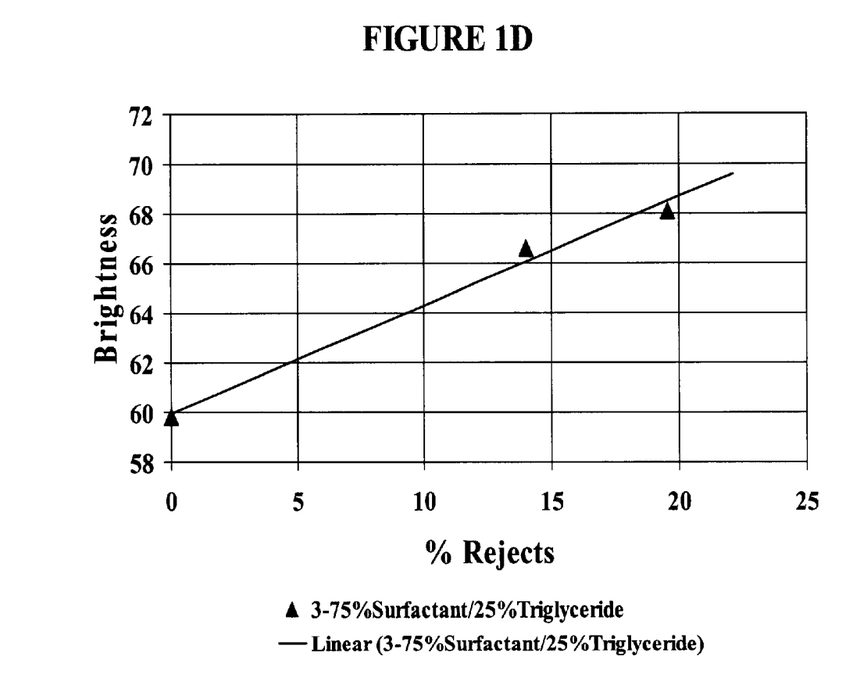
Figure 1E:
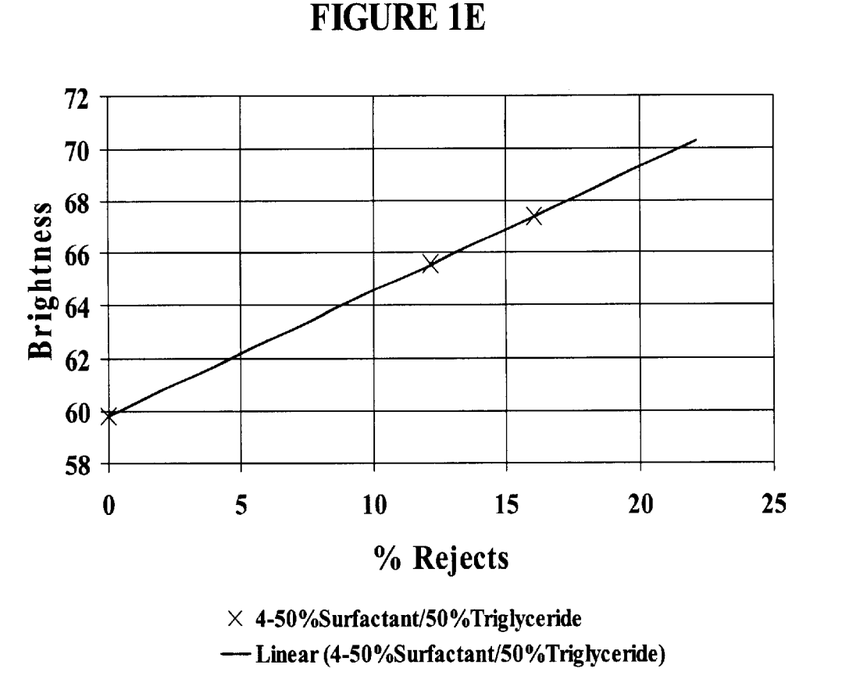
Figure 1F:
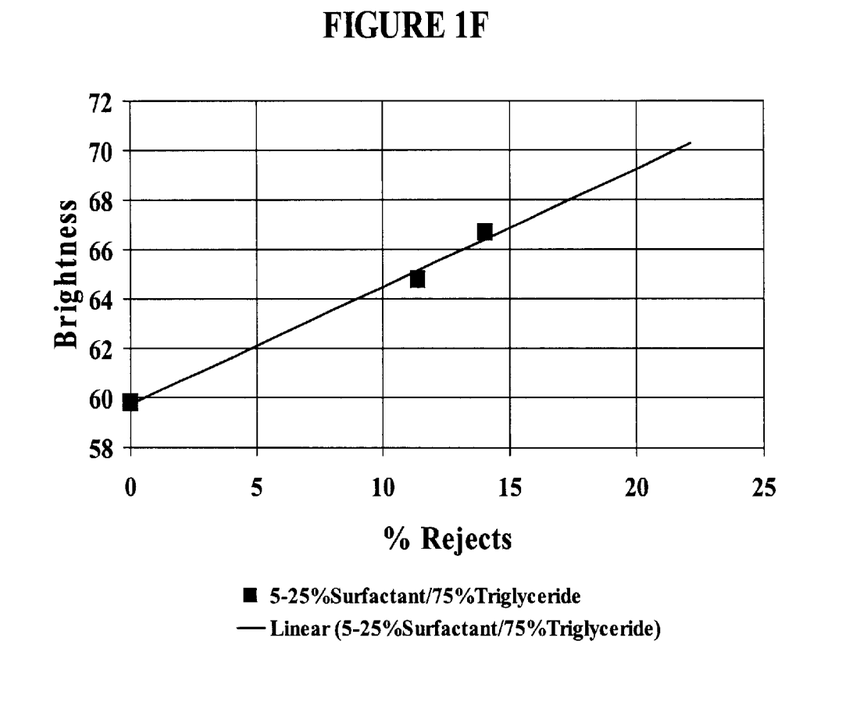

Four deinking compositions were compared against a blank (1) with no surfactant or beef tallow emulsion added. The surfactant used was an alkoxylated fatty alcohol (FLOATSAN™ 209), and the triglyceride used was the beef tallow emulsion. The four samples were (2) surfactant only, (3) 75% surfactant/25% triglyceride, (4) 50% surfactant/50% triglyceride, and (5) 25% surfactant/75% triglyceride. Each deinking composition was added to the pulp slurry at a rate of $5 \times 10^{-4}$ kg per kg of oven dried fiber (1 pound per ton of oven dried fiber). The results are listed in Table 1 below. A graphical representation of the data is shown in FIG. 1A, and additionally, linear regression of each sample set are shown in FIGS. 1B to 1F. For each sample at time zero, the % Rejects was 0 and the Brightness was 59.8.

TABLE 1

| Sample-Time (s) | % Rejects | Brightness |
|---|---|---|
| (1)–30 | 7.07 | 62.6 |
| –45 | 7.67 | 63.4 |
| –90 | 14.30 | 64.9 |
| (2)–45 | 15.63 | 66.8 |
| –90 | 22.13 | 69.4 |
| (3)–45 | 14.03 | 66.6 |
| –90 | 19.57 | 68.1 |
| (4)–45 | 12.17 | 65.6 |
| –90 | 16.07 | 67.4 |
| (5)–45 | 11.37 | 64.8 |
| –90 | 14.07 | 66.7 |

Evaluation indicated that the triglyceride emulsion reduced the foaming characteristics of pulp slurries. It was also observed that the pulp treated with the triglyceride emulsion provided higher brightness values and/or yielding lower reject rates. The effectiveness of a triglyceride emulsion is evident when comparing brightness values for similar reject rates. For example, at a brightness of 64%, the corresponding reject rate for the blank was about 11%, while it was only 8.5% for the groups using the triglyceride emulsion/surfactant combination. In other words, if the reject rate is kept the same, a higher brightness gain can be achieved using the triglyceride emulsion/surfactant combination.

EXAMPLE 2

100% Old newsprint (ONP)—This type of furnish generally has a low amount of filler, and, generally, the foaming tendency is low. Deinking systems for this type of furnish often employ the use of fatty acid soap or a fatty acid soap/surfactant combination to provide hydrophobicity. Pulp was treated with fatty acid soap, a surfactant, and a triglyceride/surfactant combination to compare the results of each type of chemistry.

PULPING

| | |
|---|---|
| Furnish | 250 g |
| Consistency | 6% |
| Temperature | 65.6° C. (150° F.) |
| pH | 10.5 ± 0.5 (final) |
| Chemicals (based on actives) | 1.0% NaOH (sodium hydroxide) |
| | 1.0% Na$_2$SiO$_3$ (sodium silicate) |
| | 0.4% DTPA (diethylenetriamine pentaacetic acid) |
| | 1.0% H$_2$O$_2$ (hydrogen peroxide) |

Pulping was done under the above conditions using an Adirondack laboratory pulper. Pulping time was set at 10 minutes at a motor capacity of 94%. Several batches were pulped and mixed thoroughly for each study in order to provide a uniform slurry. The final pulp slurry was then allowed to sit at ambient conditions for 1 hour prior to initiating flotation studies.

Figure 2A:
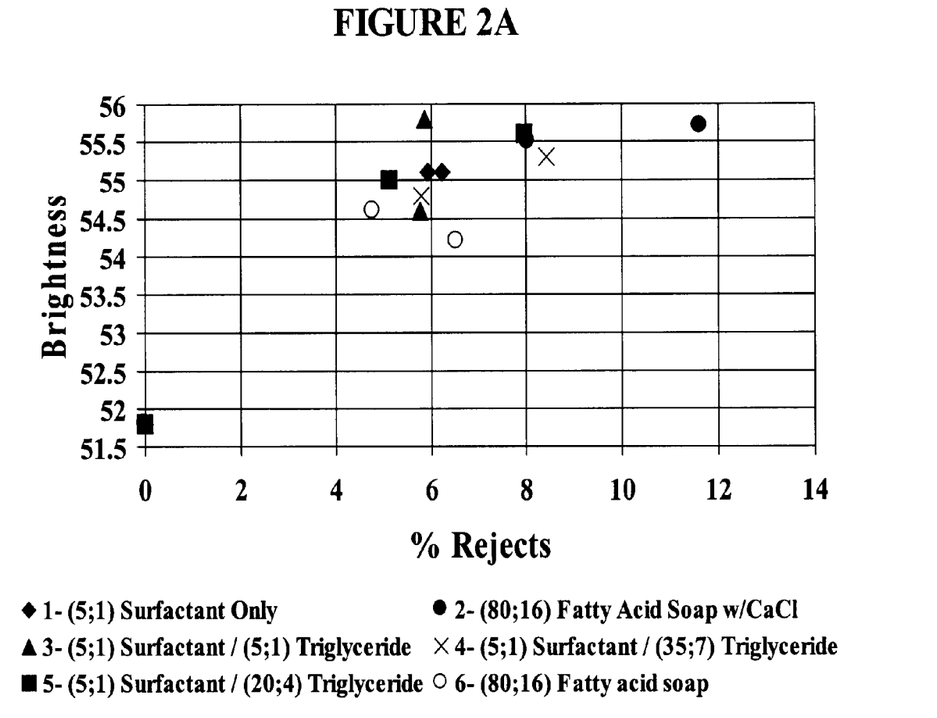
FIGS. 2A to 2G are graphical representations of the data from Example 2. The linear regression for each sample set is shown in a separate graph for clarity. In the legend, the amount of each material added is listed in the parentheses. The first value is the amount $\times 10^{-4}$ kg added per kg of oven dried fiber, and the second value is the amount in pounds added per ton of oven dried fiber.
Figure 2B:
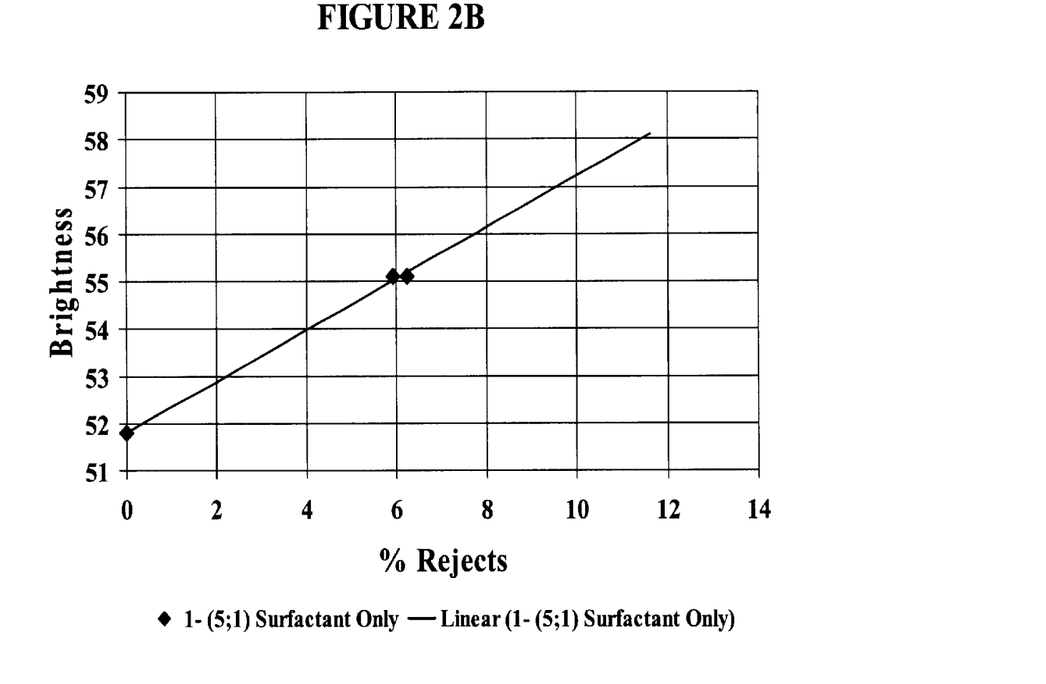
Figure 2C:
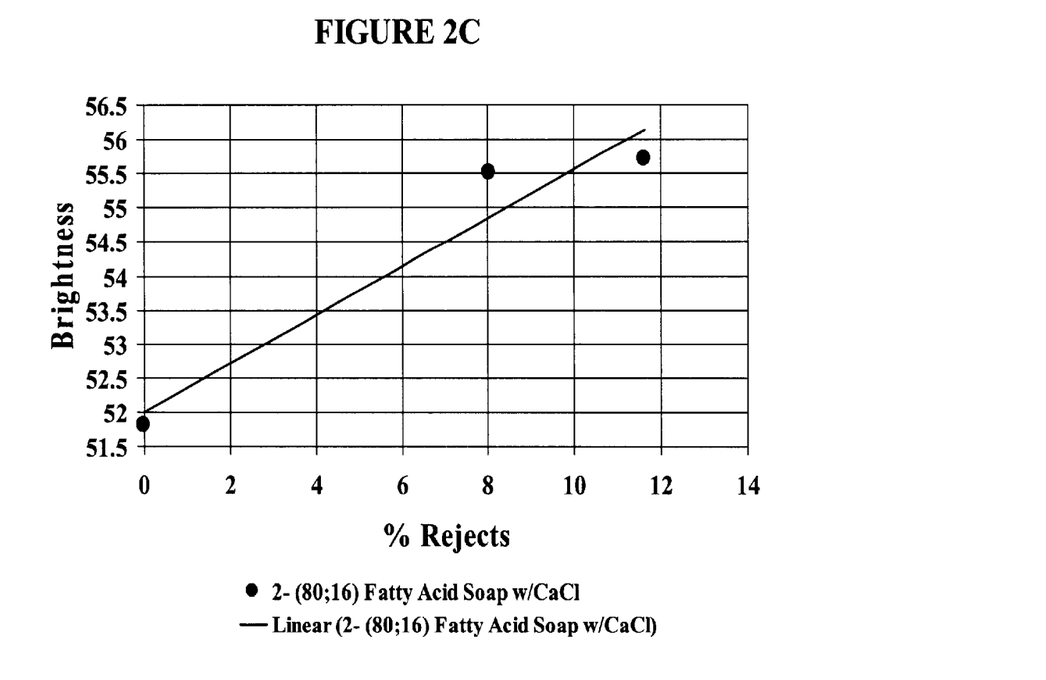
Figure 2D:
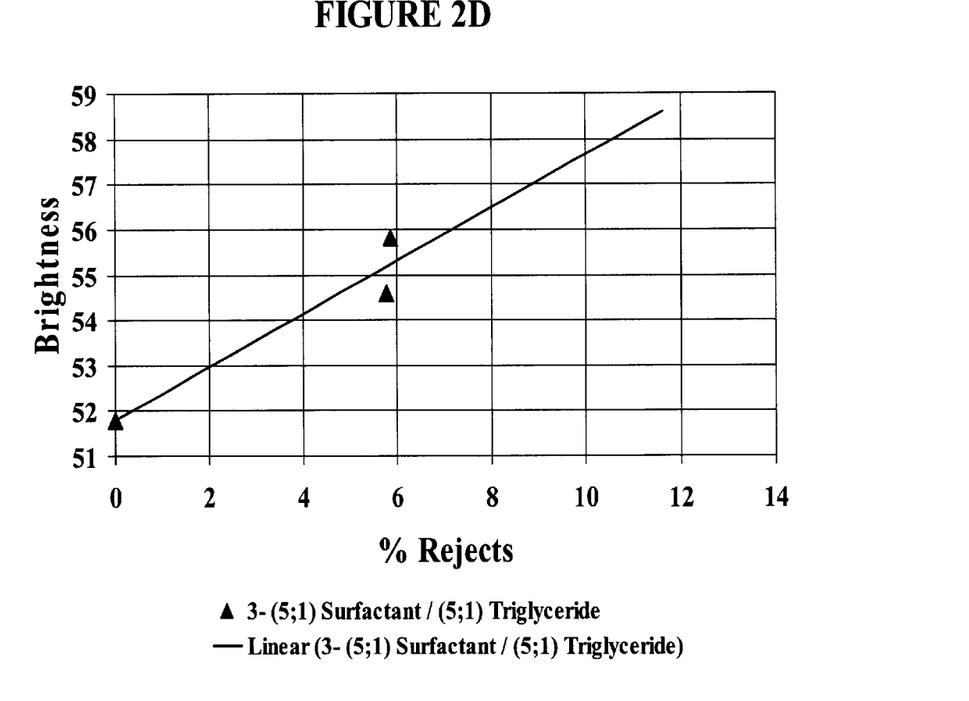
Figure 2E:
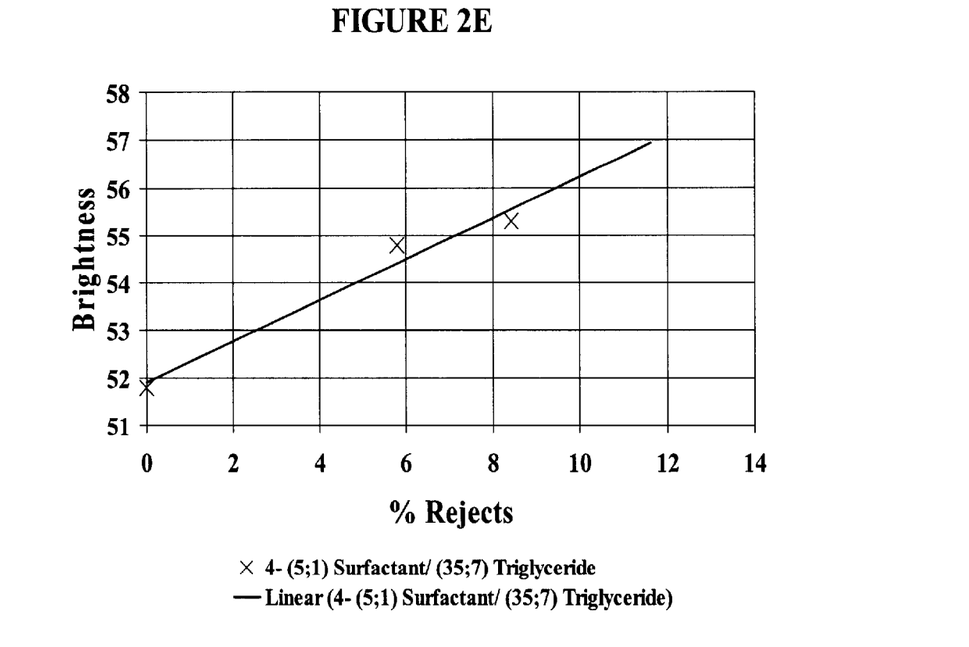
Figure 2F:
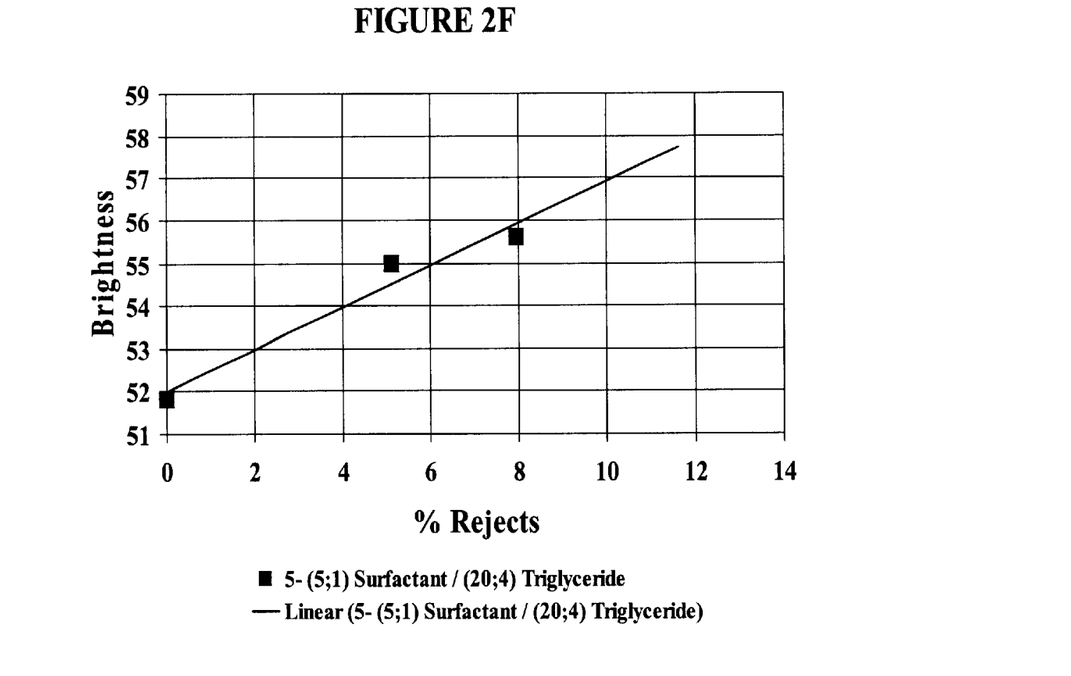
Figure 2G:
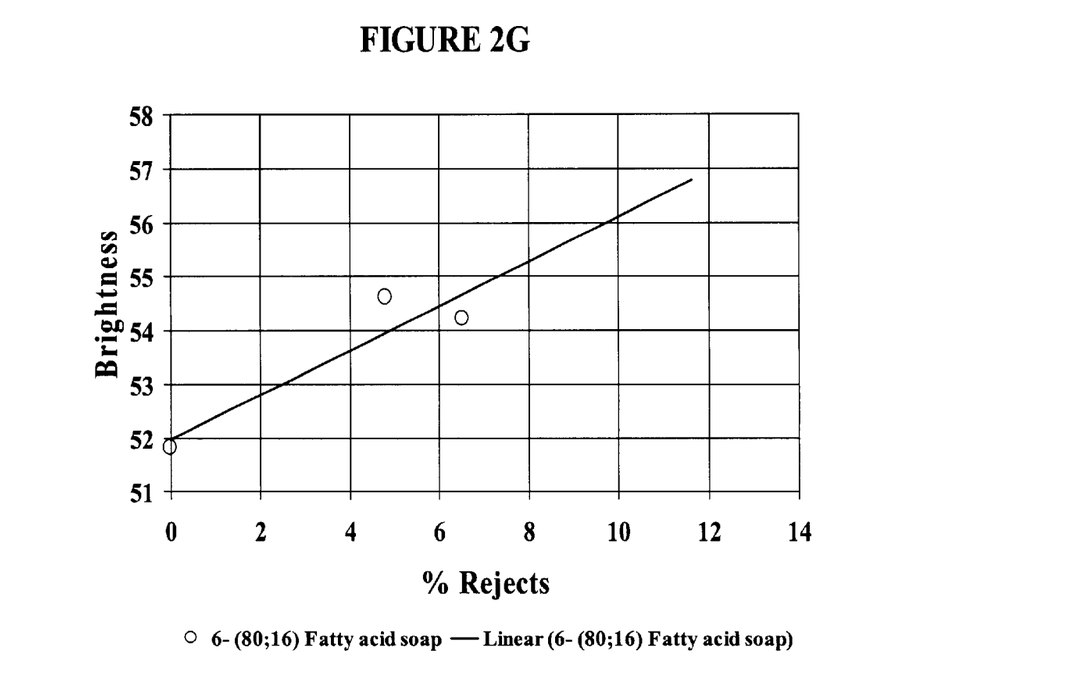

Six deinking compositions were compared. The surfactant used was an alkoxylated fatty alcohol (FLOATSAN™ 209), the triglyceride used was the beef tallow emulsion, and the fatty acid soap used was tallow fatty acid soap. The six samples were (1) surfactant only added at 5×10$^{-4}$ kg per kg of oven dried fiber (1 pound per ton of oven dried fiber), (2) fatty acid soap with calcium chloride added (150 ppm Ca$^{++}$ as CaCO$_3$) at a rate of 80×10$^{-4}$ kg per kg of oven dried fiber (16 pounds per ton of oven dried fiber), (3) triglyceride added at 5×10$^{-4}$ kg per kg of oven dried fiber (1 pound per ton of oven dried fiber) with surfactant added at 5×10$^{-4}$ kg per kg of oven dried fiber (1 pound per ton of oven dried fiber), (4) triglyceride added at 35×10$^{-4}$ kg per kg of oven dried fiber (7 pound per ton of oven dried fiber) with surfactant added at 5×10$^{-4}$ kg per kg of oven dried fiber (1 pound per ton of oven dried fiber), (5) triglyceride added at 20×10$^{-4}$ kg per kg of oven dried fiber (4 pound per ton of oven dried fiber) with surfactant added at 5×10$^{-4}$ kg per kg of oven dried fiber (1 pound per ton of oven dried fiber), and (6) fatty acid soap with no calcium chloride added at a rate of 80×10$^{-4}$ kg per kg of oven dried fiber (16 pounds per ton of oven dried fiber). Results are given in Table 2 below. A graphical representation of the data is shown in FIG. 2A, and additionally, linear regression of each sample set are shown in FIGS. 2B to 2G. For each sample at time zero, the % Rejects were 0% and the Brightness was 51.8.

TABLE 2

| Sample-Time (s) | % Rejects | Brightness |
|---|---|---|
| (1)–45 | 5.93 | 55.1 |
| –90 | 6.23 | 55.1 |
| (2)–45 | 8.03 | 55.5 |
| –90 | 11.63 | 55.7 |
| (3)–45 | 5.77 | 54.6 |
| –90 | 5.87 | 55.8 |
| (4)–45 | 5.80 | 54.8 |
| –90 | 8.43 | 55.3 |
| (5)–45 | 5.13 | 55 |
| –90 | 7.97 | 55.6 |
| (6)–45 | 4.80 | 54.6 |
| –90 | 6.53 | 54.2 |

It was observed that the triglyceride/surfactant combination provided pulp with higher brightness at a given reject rate. While fatty acid soaps can provide brightness gains similar to that of the triglyceride/surfactant combination or the surfactant only, they do so with higher reject rates.

EXAMPLE 3

80% Old Newsprint/20% Old Magazine—The additional foaming tendency of this type of furnish as compared to 100% ONP is increased because of the amount of filler present in the OMG furnish.

PULPING

| | |
|---|---|
| Furnish | 250 g |
| Consistency | 6% |
| Temperature | 65.6° C. (150° F.) |
| pH | 10.5 ± 0.5 |
| Chemicals (based on actives) | 1.0% NaOH (sodium hydroxide) |
| | 1.0% Na$_2$SiO$_3$ (sodium silicate) |
| | 0.4% DTPA (diethylenetriamine pentaacetic acid) |
| | 1.0% H$_2$O$_2$ (hydrogen peroxide) |

Pulping was done under the above conditions using an Adirondack laboratory pulper. Pulping time was set at 10 minutes at a motor capacity of 94%. Several batches were pulped and mixed thoroughly for each study in order to provide a uniform slurry. The final pulp slurry was then allowed to sit at ambient conditions for 1 hour prior to initiating flotation studies.

Figure 3A:
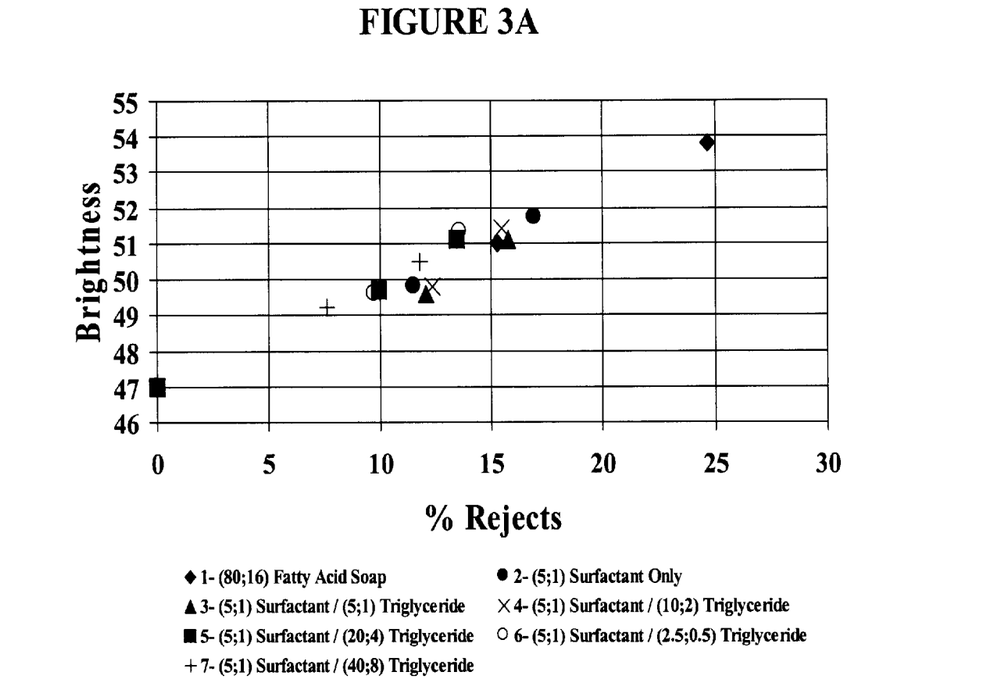
FIGS. 3A to 3H are graphical representations of the data from Example 3. The linear regression for each sample set is shown in a separate graph for clarity. In the legend, the amount of each material added is listed in the parentheses. The first value is the amount $\times 10^{-4}$ kg added per kg of oven dried fiber, and the second value is the amount in pounds added per ton of oven dried fiber.
Figure 3B:
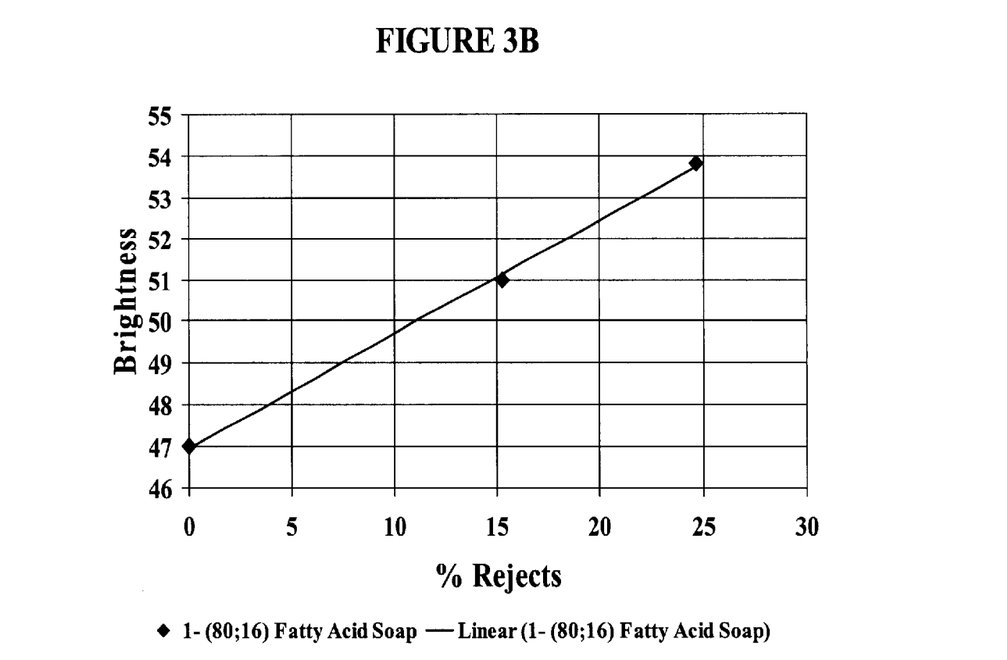
Figure 3C:
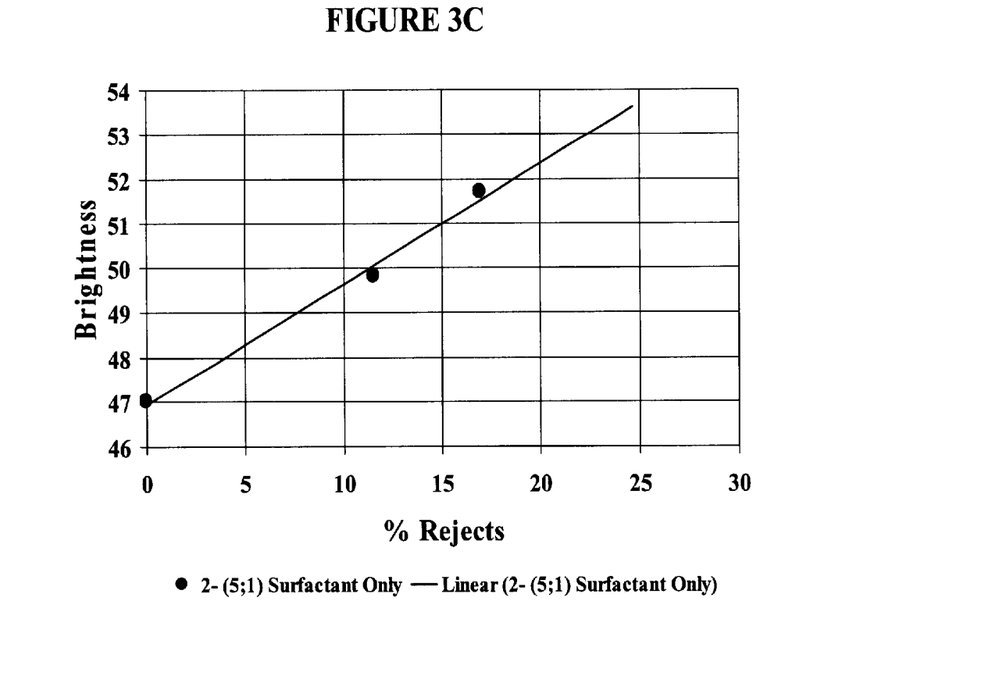
Figure 3D:
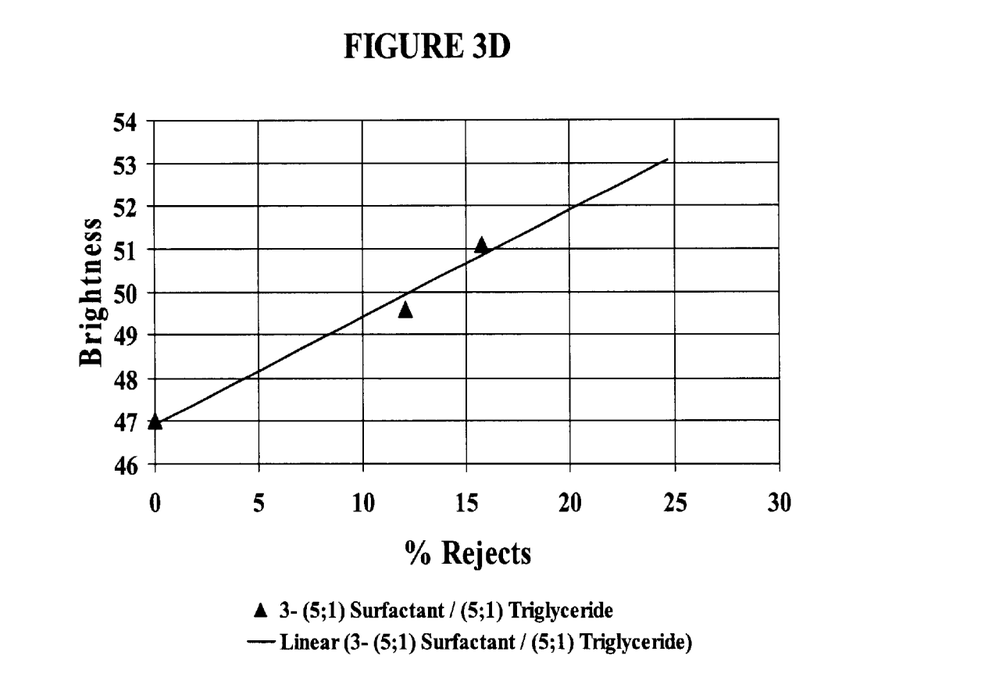
Figure 3E:
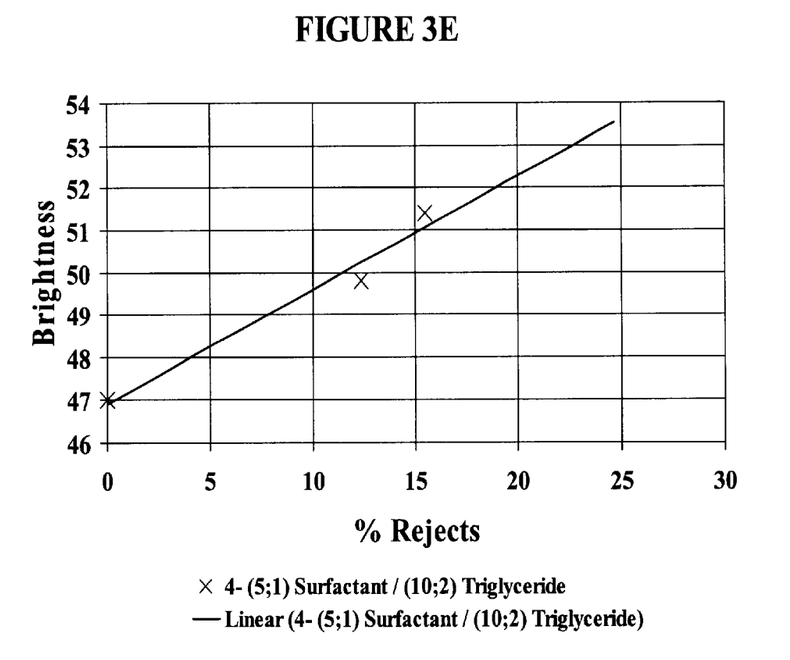
Figure 3F:
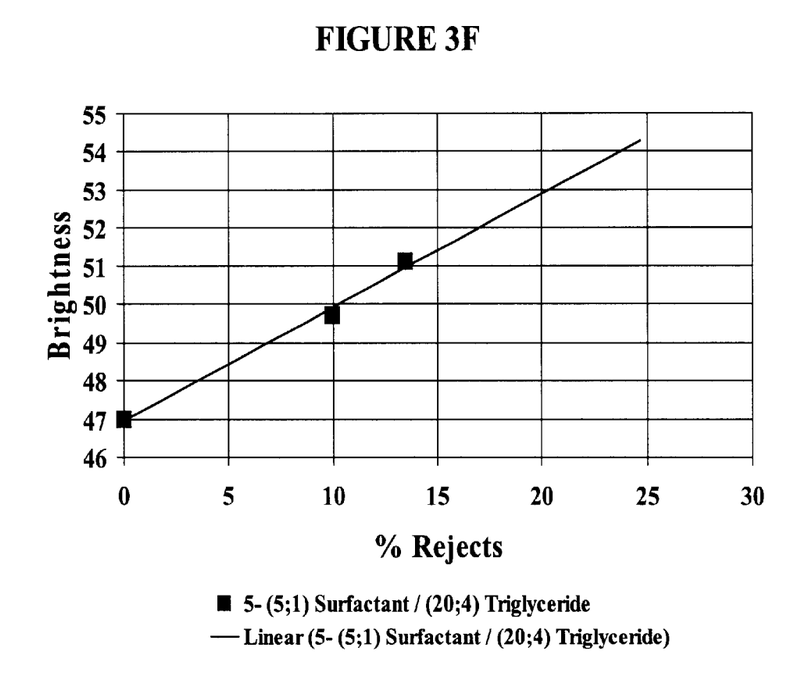
Figure 3G:
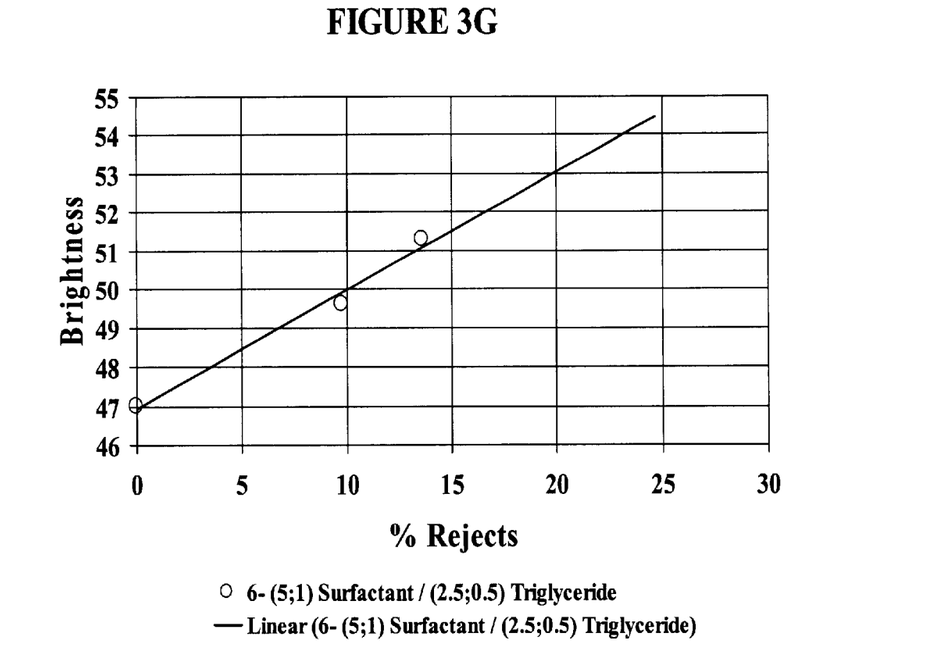
Figure 3H:
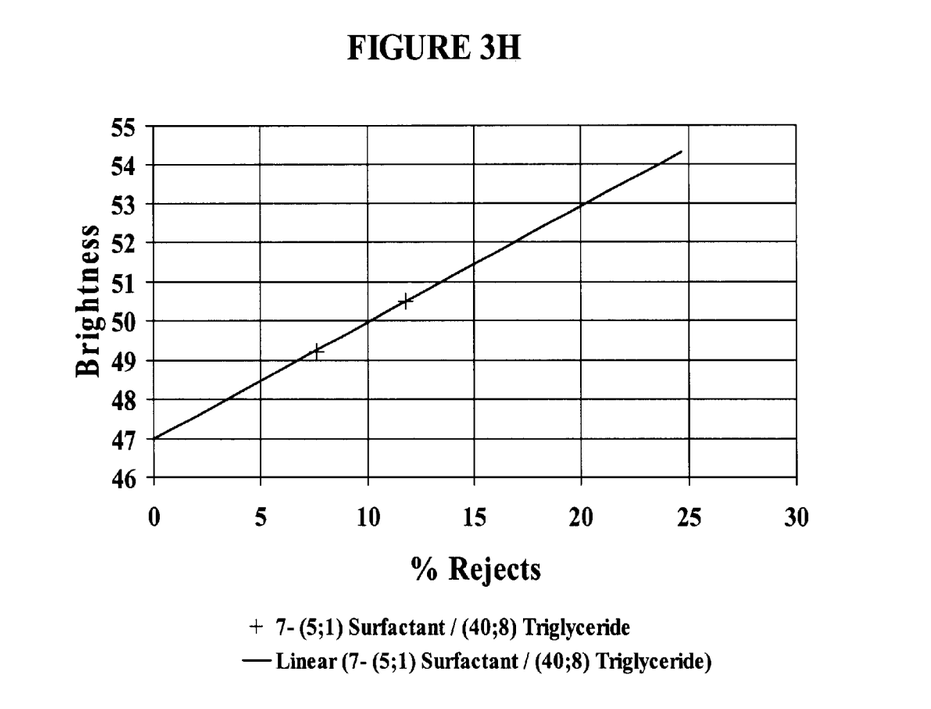

Seven deinking compositions were compared. The surfactant used was an alkoxylated fatty alcohol (FLOATSAN™ 209), the triglyceride used was the beef tallow emulsion, and the fatty acid soap used was tallow fatty acid soap. The seven samples were (1) fatty acid soap with calcium chloride added (150 ppm $Ca^{++}$ as $CaCO_3$) at a rate of $8\times10^{-3}$ kg per kg of oven dried fiber (16 pound per ton of oven dried fiber), (2) surfactant added at a rate of $5\times10^{-4}$ kg per kg of oven dried fiber (1 pound per ton of oven dried fiber), (3) triglyceride added at $5\times10^{-4}$ kg per kg of oven dried fiber (1 pound per ton of oven dried fiber) with surfactant added at $5\times10^{-4}$ kg per kg of oven dried fiber (1 pound per ton of oven dried fiber), (4) triglyceride added at $10\times10^{-4}$ kg per kg of oven dried fiber (2 pounds per ton of oven dried fiber) with surfactant added at $5\times10^{-4}$ kg per kg of oven dried fiber (1 pound per ton of oven dried fiber), (5) triglyceride added at $20\times10^{-4}$ kg per kg of oven dried fiber (4 pounds per ton of oven dried fiber) with surfactant added at $5\times10^{-4}$ kg per kg of oven dried fiber (1 pound per ton of oven dried fiber), (6) triglyceride added at $2.5\times10^{-4}$ kg per kg of oven dried fiber (0.5 pound per ton of oven dried fiber) with surfactant added at $5\times10^{-4}$ kg per kg of oven dried fiber (1 pound per ton of oven dried fiber), and (7) triglyceride added at $40\times10^{-4}$ kg per kg of oven dried fiber (8 pound per ton of oven dried fiber) with surfactant added at $5\times10^{-4}$ kg per kg of oven dried fiber (1 pound per ton of oven dried fiber). The results are shown in Table 3 below. A graphical representation of the data is shown in FIG. 3A, and additionally, linear regression of each sample set are shown in FIGS. 3B to 3H. For each sample at time zero, the % Rejects was 0 and the Brightness was 47.0.

TABLE 3

| Sample-Time (s) | % Rejects | Brightness |
|---|---|---|
| (1)–45 | 15.27 | 51 |
| –90 | 24.67 | 53.8 |
| (2)–45 | 11.57 | 49.8 |
| –90 | 16.97 | 51.7 |
| (3)–45 | 12.07 | 49.6 |
| –90 | 15.77 | 51.1 |
| (4)–45 | 12.37 | 49.8 |
| –90 | 15.50 | 51.4 |
| (5)–45 | 9.97 | 49.7 |
| –90 | 13.47 | 51.1 |
| (6)–45 | 9.77 | 49.6 |
| –90 | 13.63 | 51.3 |
| (7)–45 | 7.60 | 49.2 |
| –90 | 11.77 | 50.5 |

It was observed that the triglyceride/surfactant combination provided pulp with higher brightness at a given reject rate.

The use of a triglyceride emulsion, in place of conventional fatty acid soaps or surfactants, for flotation deinking applications has been shown to provide higher brightness values at similar reject rates. When tested in a froth flotation deinking application, the triglyceride emulsion consistently outperformed the fatty acid soap and the surfactant.

It should be appreciated that the present invention is not limited to the specific embodiments described above, but includes variations, modifications, and equivalent embodiments defined by the following claims.

What is claimed is:

1. A method of deinking paper comprising providing a paper slurry, wherein at least a portion of the paper contains a marking material, and treating the paper slurry with a deinking composition comprising at least one triglyceride, wherein the triglyceride is present in an amount sufficient to reduce foaming and to increase brightness of the paper slurry.

2. The method of claim 1, wherein the triglyceride is at least one of beef tallow and an ester of a long chain fatty acid, and wherein the fatty acid is at least one of lauric acid, myristic acid, palmitic acid, stearic acid, eleostearic acid, oleic acid, linoleic acid, and linolenic acid.

3. The method of claim 1, wherein the deinking composition further comprises a surfactant, and wherein the surfactant is at least one of an anionic surfactant, a nonionic surfactant, and a cationic surfactant.

4. The method of claim 3, wherein the surfactant is at least one of an alkoxylated fatty alcohol, a surfactant derived from a fatty acid, and a surfactant derived from a tallow fatty acid.

5. The method of claim 1, wherein the paper is at least one of mixed office waste, newspaper, and magazine paper.

6. The method of claim 1, wherein the deinking composition is added to the paper slurry in an amount from about 0.2 to about 30 pounds per ton of oven dried fiber.

7. The method of claim 3, wherein the triglyceride is present in the deinking composition from about 2% to 100% based on the weight of the triglyceride and surfactant.

8. The method of claim 3, wherein the surfactant is present in the deinking composition from 0% to about 98% based on the weight of the triglyceride and surfactant.

9. The method of claim 1, wherein the triglyceride is added to the paper slurry in en amount from about 0.2 to about 30 pounds per ton of oven dried fiber.

10. The method of claim 3, wherein the surfactant is added to the paper slurry in an amount from 0.02 to about 10 pounds per ton (about 0.01 to about 5 kg per 1000 kg) of oven dried fiber.

11. The method of claim 3, wherein the triglyceride is added to the paper slurry in an amount from about 0.2 to about 30 pounds per ton of oven dried fiber and wherein the surfactant is added to the paper slurry in an amount from 0.02 to about 10 pounds per ton of oven dried fiber.

12. The method of claim 1, wherein, the paper slurry has a consistency from about 0.2% to about 20%.

13. The method of claim 1, wherein the paper slurry has a pH from about 7 to about 12.

14. The method of claim 1, wherein the paper slurry has a temperature from about 20° C. to about 70° C.

15. The method of claim 3, wherein the deinking composition comprises beef tallow and an alkoxylated fatty alcohol.

16. The method of claim 1, further comprising passing a gas through the paper slurry.

17. The method of claim 1, wherein the method is a froth flotation process.

* * * * *